United States Patent
Galloway et al.

(10) Patent No.: US 12,136,495 B2
(45) Date of Patent: Nov. 5, 2024

(54) SIMPLE AND ROBUST CONFIGURATION FOR ICF TARGETS

(71) Applicant: Innoven Energy, LLC, Colorado Springs, CO (US)

(72) Inventors: Conner D. Galloway, Colorado Springs, CO (US); Alexander V. Valys, Colorado Springs, CO (US); Robert O. Hunter, Jr., Aspen, CO (US); David H. Sowle, Santa Maria, CA (US)

(73) Assignee: Innoven Energy, LLC, Colorado Springs, CO (US)

(*) Notice: Subject to any disclaimer, the term of this patent is extended or adjusted under 35 U.S.C. 154(b) by 967 days.

(21) Appl. No.: 15/412,405

(22) Filed: Jan. 23, 2017

(65) Prior Publication Data

US 2017/0213603 A1    Jul. 27, 2017

Related U.S. Application Data

(60) Provisional application No. 62/388,874, filed on Jan. 22, 2016.

(51) Int. Cl.
*G21B 1/19*   (2006.01)

(52) U.S. Cl.
CPC ............... *G21B 1/19* (2013.01); *Y02E 30/10* (2013.01)

(58) Field of Classification Search
CPC ... G21B 1/00; G21B 1/03; G21B 1/11; G21B 1/13; G21B 1/15
See application file for complete search history.

(56) References Cited

U.S. PATENT DOCUMENTS

| 4,034,032 | A | 7/1977 | Hendricks | |
|---|---|---|---|---|
| 4,525,323 | A | 6/1985 | Bangerter et al. | |
| 2013/0064340 | A1 | 3/2013 | Latkowski et al. | |
| 2014/0044226 | A1 | 2/2014 | Campbell et al. | |
| 2017/0229194 | A1* | 8/2017 | Galloway | G21B 1/03 |
| 2020/0118695 | A1* | 4/2020 | Hunter, Jr. | G21B 1/19 |
| 2020/0263981 | A1* | 8/2020 | Hunter, Jr. | G01B 11/255 |
| 2021/0272705 | A1* | 9/2021 | Hunter, Jr. | G21B 1/03 |

FOREIGN PATENT DOCUMENTS

| GB | 2496250 A * | 5/2013 | G02B 17/00 |
|---|---|---|---|
| WO | 2011146113 A1 | 11/2011 | |
| WO | 2017151237 A3 | 11/2017 | |

OTHER PUBLICATIONS

Yabe, Takashi, and Toshikatsu Ishikawa. Two-and three-dimensional simulation code for radiation-hydrodynamics in ICF. No. NIFS—119. National Inst. for Fusion Science, 1991. (Year: 1991).*

(Continued)

*Primary Examiner* — Lily C Garner
(74) *Attorney, Agent, or Firm* — Kilpatrick Townsend & Stockton LLP

(57) ABSTRACT

An Inertial Confinement Fusion (ICF) target may include a case comprising a plurality of beam channels; an outer shell disposed within the case; a propellant disposed between the case and the outer shell; an inner shell disposed within the outer shell; an outer fuel disposed between the outer shell and the inner shell; and an inner fuel disposed inside the inner shell.

16 Claims, 4 Drawing Sheets

(56) References Cited

OTHER PUBLICATIONS

International Preliminary Report on Patentability mailed Aug. 2, 2018 in related application PCT/US2017/014524, all pages.
Laser-Plasma Interactions in Long-Scale-Length Plasmas Under Direct-Drive National Ignition Facility Conditions, LLE Review, vol. 77, Jan. 2000, pp. 1-236.
Optimization of Deposition Uniformity for Large-Aperture NIF Substrates in a Planetary Rotation System, LLE Review, vol. 94, 2003, pp. 67-138.
Abdou et al., Critical Technical Issues and Evaluation and Comparison Studies for Inertial Fusion Energy Reactors, Fusion Engineering and Design, vol. 23, 1993, pp. 251-297.
Amendt et al., An Indirect-Drive Non-Cryogenic Double-Shell Path to 1ω Nd-laser Hybrid Inertial Fusion-Fission Energy, Nucl. Fusion, vol. 50, No. 10, 2010, pp. 1-4.
Amendt et al., Indirect-Drive Noncryogenic Double-Shell Ignition Targets for the National Ignition Facility: Design And Analysis, Physics of Plasmas, American Institute of Physics, vol. 9, No. 5, May 2002, pp. 2221-2233.
Amendt et al., Modified Bell-Plesset Effect with Compressibility: Application to Double-Shell Ignition Target Designs, Physics of Plasmas, vol. 10, No. 3, Mar. 2003, pp. 820-829.
Atzeni, 2-D Lagrangian Studies of Symmetry and Stability of Laser Fusion Targets, Computer Physics Communications, vol. 43, 1986, pp. 107-124.
Atzeni et al., Burn Performance of Fast Ignited, Tritium-Poor ICF Fuels, Nuclear Fusion, vol. 37, No. 12, 1997, pp. 1665-1677.
Atzeni et al., Fluid and Kinetic Simulation of Inertial Confinement Fusion Plasmas, Computer Physics Communications, vol. 169, 2005, pp. 153-159.
Azechi et al., Formation of Initial Perturbation of Rayleigh-Taylor Instability in Supernovae and Laser-Irradiated Targets—Is there any Similarity? The Astrophysical Journal Supplement Series, vol. 127, Apr. 2000, pp. 219-225.
Azechi et al., Model for Cannonball- Like Acceleration of Laser-Irradiated Targets, Japanese journal of Applied Physics, vol. 20, No. 7, Jul. 1981, pp. L477-L480.
Barrios et al., Electron Temperature Measurements Inside the Ablating Plasma of Gas-filled Hohlraums at the National Ignition Facility, Physics of Plasmas, vol. 23, 2016, p. 056307-1-056307-7.
Bartel et al., Microfireballs in Stratified Target Chamber Gases in the Light lon Target Development Facility, Final Report for the Period Sep. 9, 1983 to Sep. 30, 1985, Fusion Technology Institute, Sep. 1985, 24 pages.
Basko, A 6 MJ Spherical Hohlraum Target for Heavy Ion Inertial Fusion, Nuclear Fusion, vol. 39, No. 8, Aug. 1999, pp. 1031-1040.
Basko, An Improved Version of the View Factor Method for Simulating Inertial Confinement Fusion Hohlraums, Phys. Plasmas, vol. 3, No. 11, Nov. 1996, pp. 4148-4155.
Basko, New Developments in the Theory of ICF Targets, and Fast Ignition with Heavy Ions, Plasma Physics and Controlled Fusion, vol. 45, 2003, pp. A125-A132.
Bates et al., Simulations of High-Gain Shock-Ignited Inertial-Confinement-Fusion Implosions using Less than 1 MJ of Direct KrF Laser Energy, High Energy Density Physics, vol. 6, Issue 2, Dec. 3, 2009, 10 pages.
Betti, High-Z Ablator Targets for Direct-Drive Inertial Confinement Fusion, 54th Annual Meeting of the American Physical Society, Division of Plasma Physics, Oct. 29-Nov. 2, 2012, 15 pages.
Betti et al., Theory of the Deceleration Phase Rayleigh-Taylor Instability, 42nd Annual Meeting of the American Physical Society Division of Plasma Physics, Oct. 23-27, 2000, 17 pages.
Bodner, Critical Elements of High Gain Laser Fusion, Journal of Fusion Energy, Review Paper, vol. 1, No. 3, 1981, pp. 221-240.
Bodner et al., High-Gain Direct- Drive Target Design for Laser Fusion, Physics of Plasmas, 2000, pp. 1-5.
Bodner et al., Overview of New High Gain Target Design for a Laser Fusion Power Plant, Fusion Engineering and Design, vol. 60, 2002, pp. 93-98.

Boehly, The Evolution of Surface Defects Driven by Shock Waves, 54th Annual Meeting of the American Physical Society Division of Plasma Physics, Oct. 29-Nov. 2, 2012, 13 pages.
Booth et al., Prospects of Generating Power with Laser-Driven Fusion, Proceedings of the IEEE, vol. 64, No. 10, Oct. 1976, pp. 1460-1482.
Bose, Hydrodynamic Scaling of the Deceleration-Phase Rayleigh-Taylor Instability, 55th Annual Meeting of the American Physical Society Division of Plasma Physics, Nov. 11-13, 2013, 14 pages.
Bourne et al., Computational Design of Recovery Experiments for Ductile Metals, Proc. R. Soc. A, vol. 461, 2005, pp. 3297-3312.
Bradley et al., ASC Simulations of 2014 and 2015 2-Shock Campaign Shots, NEDPC 2015 Proceedings, Nuclear Explosives Design Physics Conference, 2015, 8 pages.
Brueckner et al., Laser-Driven Fusion, Reviews of Modern Physics, vol. 46, No. 2, Apr. 1974, pp. 325-367.
Bugrov et al., Interaction of a High-Power Laser Beam with Low-Density Porous Media, Journal of Experimental and Theoretical Physics, vol. 84, No. 3, Mar. 1997, pp. 497-505.
Buttler et al., The Study of High-Speed Surface Dynamics using a Pulsed Proton Beam, AIP Conference Proceedings on the Shock Compression of Condensed Matter, 2013, 5 pages.
Buttler et al., Transport of Particulate Matter from a Shocked Interface, AIP Conference on Shock Compression of Condensed Matter, Jun.-Jul. 2011, 10 pages.
Buttler et al., Unstable Richtmyer-meshkov Growth of Solid and Liquid Metals in Vacuum, J. Fluid Mech., vol. 703, 2012, pp. 60-84.
Callahan et al., A Distributed Radiator, Heavy Ion Target Driven by Gaussian Beams in a Multibeam Illumination Geometry, Nuclear Fusion, vol. 39, No. 7, 1999, pp. 883-891.
Callahan et al., Advances in Target Design for Heavy-Ion Fusion, 32nd European Physical Society Plasma Physics Conference Barcelona, Spain, 2005, 18 pages.
Caruso et al., Physical Processes in a Laser-greenhouse Target: Experimental Results, Theoretical Models, and Numerical Calculations, Journal of Russian Laser Research, vol. 21, No. 4, 2000, pp. 335-369.
Casey et al., Reduced Instability Growth With High-adiabat High-foot Implosions at the National Ignition Facility, Phys Rev E Stat Nonlin Soft Matter Phys., vol. 90, No. 1, 2014, 5 pages.
Cauble et al., Demonstration of 0.75 Gbar Planar Shocks in X-ray Driven Colliding Foils, Phys Rev Lett., vol. 70, No. 14, 1993, 5 pages.
Cerjan, Integrated Diagnostic Analysis of ICF Capsule Performance, Lawrence Livermore National Laboratory, DPP-APS Annual Meeting, Oct. 29, 2012, 24 pages.
Cerjan et al., Integrated Diagnostic Analysis of Inertial Confinement Fusion Capsule Performance, Physics of Plasmas, vol. 20, 2013, pp. 056319-1-056319-9.
Chu, The Electron Cyclotron Maser, Reviews of Modern Physics, vol. 76, 2004, 52 pages.
Clark et al., Detailed Implosion Modeling of Deuterium-tritium Layered Experiments on the National Ignition Facility, Physics of Plasmas, vol. 20, 2013, pp. 056318-1-056318-14.
Clark, Detailed Implosion Modeling of DT-Layered Experiments on the National Ignition Facility, 54th APS—DPP Meeting, Oct. 29, 2012, 31 pages.
Clark et al., Progress in Modeling Ignition Implosion Experiments on the National Ignition Facility, 8th International Conference on Inertial Fusion Sciences and Applications Nara, Japan, Oct. 2013, 6 pages.
Clark et al., Radiation Hydrodynamics Modeling of the Highest Compression Inertial Confinement Fusion Ignition Experiment From the National Ignition Campaign, Physics of Plasmas, vol. 22, 2015, pp. 022703-1-022703-18.
Dimonte, Nonlinear Hydrodynamics, Instabilities and Turbulent Mix, Workshop on Scientific Opportunities in High Energy Density Plasma Physics, Aug. 25-27, 2008, 32 pages.
Dittrich et al., Design of a High-Foot High-Adiabat ICF Capsule for the National Ignition Facility, Phys Rev Lett., vol. 112, No. 5, 2014, pp. 055002-1-055002-5.

(56) References Cited

OTHER PUBLICATIONS

Doeppner, Mix in Cryogenic Dt Layered Implosions on the NIF, Presentation to the 54th Annual Meeting of the APS Division of Plasma Physics Providence, 2012, 32 pages.
Eggert, Shock and Ramp Compression Experiments: Recent Developments, European XFEL HED instrument user workshop Hamburg, Germany, 2014, 45 pages.
Eliezer et al., The Physics of Directly Driven Targets, Nuclear Fusion by Inertial Confinement: A Comprehensive Treatise, 1993, pp. 43-71.
Engelstad et al., Near Term ICF Target Test Chambers, 1996, 52 pages.
Fittinghoff et al., The Neutron Imaging System Fielded at the National Ignition Facility, EPJ Web of Conferences, vol. 59, 2013, pp. 13016-p. 1-13016-p. 5.
Fong et al., Stability of Converging Shock Waves, Physics of Fluids, vol. 22, No. 3, 1979, pp. 416-421.
Fujita et al., Implosion Property of Cannonball Target at 10.6 µm Laser Wavelength, Japanese Journal of Applied Physics, vol. 25, No. 2, Feb. 1986, pp. L145-LI47.
Fung et al., Ejecta Modeling in the Flag Hydrocode, 11th US National Congress on Computational Mechanics Minneapolis, Minnesota, 2011, 13 pages.
Gamaly, Hydrodynamic Instability of Target Implosion in Icf, Nuclear Fusion by Inertial Confinement: A Comprehensive Treatise, 1993, pp. 321-349.
Glenzer et al., Cryogenic Thermonuclear Fuel Implosions on the National Ignition Facility, Phys. of Plasmas, vol. 19, 2012, pp. 056318-1-056318-15.
Glenzer et al., First Implosion Experiments With Cryogenic Thermonuclear Fuel on the National Ignition Facility, Plasma Phys. Control. Fusion, vol. 54, 2012, pp. 1-13.
Goldstein, Science of Fusion Ignition on NIF, U.S. Department of Energy by Lawrence Livermore National Laboratory, May 22-24, 2012, 111 pages.
Grim et al., Nuclear Imaging of the Fuel Assembly in Ignition Experiments, Physics of Plasmas, vol. 20, 2012, 30 pages.
Grim et al., Nuclear Imaging of the Fuel Assembly in Ignition Experiments a), Phys. Plasmas, vol. 20, 2013, pp. 056320-1-056320-12.
Haan et al., Design and modeling of ignition targets for the National Ignition Facility, Physics of Plasmas, vol. 2, No. 6, Jun. 1995, pp. 2480-2487.
Haan et al., Instability Growth Seeded by Oxygen in CH Shells on the National Ignition Facility, Physics of Plasmas, 2014, 30 pages.
Haan et al., Point design targets, specifications, and requirements for the 2010 ignition campaign on the National Ignition Facility, Physics of Plasmas, vol. 18, 2011, pp. 051001-1-051001-47.
Hammerberg et al., A Class of Ejecta Transport Test Problems, Necdc 2010 Conference, Los Alamos, 2011, 11 pages.
Hammerberg et al., Transport of Particle Matter From a Shocked Interface, American Physical Society March Meeting, 2011, 17 pages.
Hibbard et al., Precision Manufacturing of Inertial Confinement Fusion Double Shell Laser Targets for Omega, Fusion Science and Technology, vol. 45, Mar. 2004, pp. 117-123.
Hicks et al., Implosion dynamics measurements at the National Ignition Facility, Phys. Plasmas, vol. 19, 2012, 27 pages.
Hohenberger, Polar-direct-drive experiments on the National Ignition Facility, Physics of Plasmas, vol. 22, 2015, 16 pages.
Hurricane et al., The high-foot implosion campaign on the National Ignition Facility, Physics of Plasmas, vol. 21, 2014, 15 pages.
Izawa et al., Target Fabrication, Nuclear Fusion by Inertial Confinement: A Comprehensive Treatise, 1993, pp. 515-553.
Johnson et al., Neutron spectrometry—An essential tool for diagnosing implosions at the National Ignition Facility (invited), Review of Scientific Instruments, vol. 83, 2012, 7 pages.
Kane et al., Interface Imprinting by a Rippled Shock using an Intense Laser, Physical Review E, vol. 63, 2001, 4 pages.

Karasik, Inertial Fusion Energy with Direct Drive and KrF Lasers, Plasma Physics Division, U.S. Naval Research Laboratory, 2013, 46 pages.
Karow et al., Particle-Beam-Driven ICF Experiments, Nuclear Fusion by Inertial Confinement: A Comprehensive Treatise, Chapter 23, 1993, pp. 597-614.
Keane, National Ignition Facility High-Energy-Density and Inertial Confinement Fusion Peer-Review Panel (PRP) Final Report, NIF HED/ICF Peer-Review Panel Final Report, Lawrence Livermore National Laboratory, 2014, 32 pages.
Kessler et al., ICF Reactors—Conceptual Design Studies, Nuclear Fusion by Inertial Confinement; A Comprehensive Treatise, Chapter 25, 1993, pp. 673-723.
Kindel et al., Double-Shell Target Designs for the Los Alamos Scientific Laboratory Eight-beam Laser System, 1978, 14 pages.
Kirkwood et al., A Review of Laser-plasma Interaction Physics of Indirect-Drive Fusion, Plasma Phys. Control. Fusion, vol. 55, No. 10, Sep. 12, 2013, 27 pages.
Kirkwood et al., Producing High Energy ns Pump Beams for Raman Amplification of Short Pulses using SBS Beam Combination, Presentation at IZEST, 2013, 22 pages.
Kitagawa et al., Soft-X-Ray Emission from 1 µm Laser-Irradiated Cannonball Target, Japanese Journal of Applied Physics, vol. 25, Part 2, No. 3, Feb. 22, 1986, pp. L171-L174.
Kline et al., Demonstration of an Optical Mixing Technique to Drive Kinetic Electrostatic Electron Nonlinear Waves in Laser Produced Plasmas, 2012, 13 pages.
Kline, Hohlraum Drive and Implosion Velocity Scaling to 500 Tw Laser Drive on Nif, 54th Annual Meeting of the APS Division of Plasma Physics, 2012, 40 pages.
Knauer et al., Neutron Spectra Measured with Time-of-Flight Detectors on the National Ignition Facility, Division of Plasma Physics, 2011, 17 pages.
Krauser et al., Ignition Target Design and Robustness Studies for the National Ignition Facility, Physics of Plasmas, vol. 3, No. 5, Jan. 25, 1996, pp. 2084-2093.
Kritcher et al., Metrics for Long Wavelength Asymmetries in Inertial Confinement Fusion Implosions on the National Ignition Facility, Physics of Plasmas, vol. 21, Issue 4, 2014, pp. 042708-1-042708-10.
Laffite et al., Time History Prediction of Direct-drive Implosions on the Omega Facility, Physics of Plasmas, vol. 23, Issue 1, Dec. 2016, pp. 012706-1-012706-6.
Lafon, Hydrodynamic Stability of Direct-Drive Targets with High-Z Ablators, 2012, 12 pages.
Lindl, Development of the Indirect-Drive Approach to Inertial Confinement Fusion and the Target Physics Basis for Ignition and Gain, Physics of Plasmas, vol. 2, Issue 11, Jun. 1995, pp. 3933-4024.
Lindl et al., The Physics Basis for Ignition Using Indirect-Drive Targets on the National Ignition Facility, Physics of Plasmas, vol. 11, Issue 2, Feb. 2004, pp. 339-491.
Linford et al., Design Descriptions of the Prometheus-L and -H Inertial Fusion Energy Drivers, Fusion Engineering and Design, vol. 25, 1994, pp. 111-124.
Loomis, Summaries of FY13 Lanl Experimental Campaigns at the OMEGA Laser Facility, Los Alamos National Laboratory, Laboratory for Laser Energetics Annual Report, Oct. 3, 2013, 17 pages.
Ma et al., Onset of Hydrodynamic Mix in High-Velocity, Highly Compressed Inertial Confinement Fusion Implosions, Physical Review Letters, vol. 111, No. 8, American Physical Society, Aug. 23, 2013, pp. 085004-1-085004-5.
Ma et al., Thin Shell, High Velocity Inertial Confinement Fusion Implosions on the National Ignition Facility, Physical Review Letters, vol. 114, No. 14, American Physical Society, Apr. 10, 2015, pp. 145004-1-145004- 6.
MacLaren et al., Novel Characterization of Capsule X-Ray Drive at the National Ignition Facility, Physical Review Letters, vol. 112, No. 10, Mar. 14, 2014, pp. 105003-1-105003-5.
Martinez-Val et al., An Introduction to Nuclear Fusion by Inertial Confinement, Nuclear Fusion by Inertial Confinement: A Comprehensive Treatise, Chapter 1, 1993, 40 pages.

(56) References Cited

OTHER PUBLICATIONS

McClellan, Double-Shelled Target Simulations with Lasnex, Lawrence Livermore Laboratory, Oct. 24, 1978, 19 pages.
McCrory, Laser-Driven Icf Experiments, Nuclear Fusion by Inertial Confinement: A Comprehensive Treatise, Chapter 22, 1993, pp. 555-596.
Meezan, Inflight Properties of NIF Ignition Capsules Inferred from Convergent Ablator Experiments, 2012, 35 pages.
Merrill et al., The Neutron Imaging Diagnostic at NIF (Invited)a), Review Of Scientific Instruments, vol. 83, No. 10, 2012, pp. 10D317-1-10D317-6.
Metzler et al., Target Study for Heavy Ion Beam Fusion†, Laser and Particle Beams, vol. 2, Part 1, 1984, pp. 27-48.
Molvig et al., Low Convergence Path to Fusion Ignition, Los Alamos National Laboratory, 2016, 28 pages.
Montgomery et al., LANL Double Shell Design and Preliminary Results, PSS/DS Workshop 2025, Los Alamos, Jan. 25-26, 2016, 30 pages.
Moses et al., High Energy Density Simulations for Inertial Fusion Energy Reactor Design, 16th ANS Topical Meeting on Fusion Energy, Sep. 14-16, 2004, 8 pages.
Murakami et al., Indirectly Driven Targets for Inertial Confinement Fusion, Nuclear Fusion, vol. 31, No. 7, 1991, pp. 1315-1331.
Nakai et al., Nuclear Aspects and Design of an Inertial Confinement Fusion Reactor, Fusion Engineering and Design, vol. 16, 1991, pp. 173-182.
National Research Council, An Assessment of the Prospects for Inertial Fusion Energy, Retrieved from internet at: http://www.nap.edu/catalog.php?record_id=18289, 2013, 247 pages.
National Research Council, Assessment of Inertial Confinement Fusion Targets, 2013, 119 pages.
Nietiadi et al., Sputtering of Si Nanospheres, Physical Review, vol. 90, No. 4, 2014, pp. 045417-1-045417-9.
Nikroo, Target Fabrication for NIF and Inertial Fusion Energy (IFE), 2013, 23 pages.
Nishimura et al., Radiation-Driven Cannonball Targets for High-Convergence Implosions, Laser and Particle Beams, vol. 11, No. 1, 1993, pp. 89-96.
Nuckolls, Fusion Scientists are Encouraged by Recent Experiments Demonstrating the Efficient Coupling of Laser Light to Targets and New Ideas for Economically Competitive Power Plants, The Feasibili of Inertial—Confinement Fusion, 1982, pp. 24-31.
Nuckolls, Future of Inertial Fusion Energy, Nature, vol. 412, Sep. 4, 2002, pp. 775-776.
Nuckolls, Inertial Confinement Fusion Targets, Lawrence Livermore Lab., Oct. 4, 1977, 6 pages.
Nuckolls, Laser Induced Implosion and Thermonuclear Burn, Jul. 23, 1973, 42 pages.
Nuckolls, Laser-induced Implosion and Thermonuclear Burn, Laser Interaction and Related Plasma Phenomena, 1974, pp. 399-425.
Nuckolls, Prospects For Laser Fusion, Lawrence Livermore Laboratory, May 13, 1974, 5 pages.
Nuckolls, Target Design, 1979, 330 pages.
Pape et al., Observation of a Reflected Shock in an Indirectly Driven Spherical Implosion at the National Ignition Facility, Physical Review Letters, Jun. 6, 2014, 5 pages.
Park et al., High-Adiabat High-Foot Inertial Confinement Fusion Implosion Experiments on the National Ignition Facility, Physical Review Letters, Feb. 7, 2014, 5 pages.
International Application No. PCT/US2017/014524, International Search Report and Written Opinion mailed on Oct. 4, 2017, 8 pages.
Peterson et al., Pressure Loadings on the Walls of a Light Ion Laboratory Microfusion Facility Target Chamber, Fusion Technology Institute University of Wisconsin-Madison WI 53706, vol. 608 (http://fti.neep.wisc.edu), Oct. 11, 1990, 9 pages.
Pollaine et al., National Ignition Facility Scale Hohlraum Asymmetry Studies by Thin Shell Radiography, Physics of Plasmas, vol. 8, Issue No. 5 http://dx.doi.org/10.1063/1.1364514, 2001, pp. 2357-2365.
Radha et al., Simulations and results from the National Ignition Facility, Physics of Plasmas, vol. 23 http://dx.doi.org/10.1063/1.4946023, 2016, 13 pages.
Raman et al., An In-Flight Radiography Platform to Measure Hydrodynamic Instability Growth in Inertial Confinement Fusion Capsules at the National Ignition Facility, Physics of Plasmas, vol. 21, http://dx.doi.org/10.1063/1.4890570, 2014, 21 pages.
Regan et al., Hot-Spot Mix in Ignition-Scale Inertial Confinement Fusion Targets, Physical Review Letters, Jul. 26, 2013, 5 pages.
Reinovsky et al., High Energy Density Physics Experiments with Compact Pulsed Power Drivers and Advanced Diagnostics (U), 2011, 22 pages.
Reintjes et al., Stimulated Raman and Brillouin Scattering, 2010, 59 pages.
Reis et al., The Big Science of Stockpile Stewardship, Physics Today, vol. 68, No. 8, Retrieved from Internet: http://dx.doi.org/10.1063/PT.3.3268, 2016, 9 pages.
Remington et al., Hydrodynamic Instabilities and Mix Studies on NIF: predictions, observations, and a path forward, Oct. 24, 2013, 7 pages.
Roberts et al., The Stability of Multiple-Shell ICF Targets, The Institute of Physics, vol. 13, 1980, pp. 1957-1969.
Robey et al., High Performance Capsule Implosions on the OMEGA Laser Facility with Rugby Hohlraums, Physics of Plasmas, vol. 17, 2010, pp. 1-11.
Robey et al., Hohlraum-Driven Mid-Z (SiO2) Double-Shell Implosions on the Omega Laser Facility and Their Scaling to NIF, Physical Review Letters, Oct. 2, 2009, pp. 1-4.
Robey et al., Precision Shock Tuning on the National Ignition Facility, Physics Review Letters, vol. 108, No. 21, 2012, 5 pages.
Rosen et al., The Indirect Drive Ignition Campaign on the National Ignition Facility (NIF), Jul. 18, 2013, 52 pages.
Rosocha et al., Excimer Lasers For Icf, Nuclear Fusion by Inertial Confinement: A Comprehensive Treatise, Chapter 15, 1993, pp. 371-420.
Roth et al., Fast Ignition by Intense Laser-Accelerated Proton Beams, Physical Review Letters, vol. 86, No. 3, Jan. 15, 2001, 4 pages.
Rygg et al., 2D X-Ray Radiography of Imploding Capsules at the National Ignition Facility, Physical Review Letters, May 16, 2014, 7 pages.
Rykovanov et al., Interaction of Intense Laser Pulses with Overdense Plasmas, Theoretical and Numerical Study, Nov. 2, 2009, 124 pages.
Schnittaman et al., Indirect-Drive Radiation Uniformity in Tetrahedral Hohlraums, Physics of Plasmas, vol. 3, No. 10http://dx.doi.org/10.1063/1.871511, 1996, 13 pages.
Scott et al., Numerical Modeling of the Sensitivity of X-Ray Driven Implosions to Low-Mode Flux Asymmetries, 2012, 5 pages.
Sethian et al., Target Physics Issues, Naval Research Laboratory, Jun. 20, 2000, 16 pages.
Shvydky, Two-Dimensional Numerical Evaluation of 1-D Multi-FM SSD Experiments on Omega EP, 2013, 12 pages.
Smalyuk et al., First Measurements of Hydrodynamic Instability Growth in Indirectly Driven Implosions at Ignition-Relevant Conditions on the National Ignition Facility, Physical Review Letters, May 9, 2014, 7 pages.
Smith, Reflectivity Variation of Target Surfaces, Innoven Proprietary YELLOW Document, May 27, 2016, 15 pages.
Soures, Solid-state Lasers for Icf, Nuclear Fusion by Inertial Confinement: A Comprehensive Treatise, Chapter 14, 1993, pp. 351-370.
Stepanov et al., Energy Efficiency of Laser Greenhouse Target for Small Number of Irradiating Beams, Proceedings of SPIE, vol. 5228, 2003, pp. 233-243.
Takabe et al., Effect of Nonuniform Implosion on High-Gain Intertial Confinement Fusion Targets, Japanese Journal of Applied Physics, vol. 32, Part 1, No. 12A, 1993, pp. 5675-5680.
Temporal et al., Irradiation uniformity of directly driven inertial confinement fusion targets in the context of the shock-ignition scheme, Plasma Phys. Control. Fusion, vol. 53, 10 pages, 2011.
Temporal et al., Three-Dimensional Study of Radiation Symmetrization in Some Indirectly Driven Heavy Ion ICF Targets, Nuclear Fusion, vol. 32, No. 4, 1992, pp. 557-567.

(56) References Cited

OTHER PUBLICATIONS

Teubner et al., Absorption and Hot Electron Production by High Intensity Femtosecond UV-Laser Pulses in Solid Targets, Physical Review E, vol. 54, No. 4, Oct. 1996, 11 pages.

Timmes X-2 et al., Spatial-Temporal Convergence Properties of the Tri-lab Verification Test Suite in 1d for Code Project A, 2006, 55 pages.

Tommasini et al., Tent-induced perturbations on areal density of implosions at the National Ignition, Physics of Plasmas, vol. 22, Issue. 5, 2015, 8 pages.

Town et al., Dynamic Symmetry of Indirectly Driven Inertial Confinement Fusion Capsules on the National Ignition Facilitya), Physics of Plasmas, vol. 21, 2014, 10 pages.

Uesaka et al., Parametric Survey of Microfireball Calcuilation for the Light Fusion Target Development Facility Design, Fusion Technology Institute, Aug. 1983, 62 pages.

Vandevender, Light-ion Accelerators for ICF, Nuclear Fusion by Inertial Confinement: A Comprehensive Treatise, Chapter 18, 1993, pp. 455-483.

Varnum et al., Progress toward Ignition with Noncryogenic Double-Shell Capsules, Physical Review Letters, vol. 84, No. 22, May 29, 2000, 3 pages.

Velarde et al., Nuclear Fusion by Inertial Confinement A Comprehensive Treatise, 1993, 759 pages.

Weilacher et al., The Effect of Laser Spot Shapes on Polar-Direct-Drive Implosions on the National Ignition Facility, Physics of Plasmas, vol. 22, 2015, 32 pages.

Welser et al., Development of Two Mix Model Postprocessors for the Investigation of Shell Mix in Indirect Drive Implosion Cores, Physics of Plasmas, vol. 14, 2007, 6 pages.

Winterberg, Mini Fission-Fusion-Fission Explosions (Mini-Nukes). A Third Way Towards the Controlled Release of Nuclear Energy by Fission and Fusion, z. Naturforsch, vol. 59a, 2004, pp. 325-336.

Yabe, The Compression Phase in Icf Targets, Nuclear Fusion by Inertial Confinement: A Comprehensive Treatise, Chapter 11, 1993, pp. 269-292.

Yabe et al., Theoretical and Computational Investigation on Implosion Process, Laser Interaction and Related Plasma Phenomena, 1984, pp. 857-868.

Yamanaka, Diagnostics of Laser-imploded Plasma, Nuclear Fusion by Inertial Confinement: A Comprehensive Treatise, Chapter 20, 1993, pp. 497-513.

Zinamon, Ion Beams-Target Interaction, Nuclear Fusion by Inertial Confinement: A Comprehensive Treatise, Chapter 5, 1993, pp. 119-150.

Zylstra et al., In-Flight Observations of Low-Mode ρR Asymmetries in NIF Implosionsa), Physics of Plasmas, vol. 22, 2015, pp. 056301-1-056301-9.

\* cited by examiner ic # SIMPLE AND ROBUST CONFIGURATION FOR ICF TARGETS

CROSS-REFERENCES TO RELATED APPLICATIONS

This application claims the benefit of U.S. Provisional Application No. 62/388,874 filed on Jan. 22, 2016, which is incorporated herein by reference.

BACKGROUND

Nuclear fusion by inertial confinement, Inertial Confinement Fusion ("ICF"), utilizes nuclear fusion reactions to produce energy. In most types of ICF systems, an external drive mechanism, such as a laser, delivers energy to a target containing nuclear fusion fuel. The target is designed to use this energy to compress, heat and ignite the fusion fuel within the target. If a sufficient amount of fuel is compressed sufficiently and heated sufficiently, a self-sustaining fusion reaction can occur in which energy produced by fusion reactions continues to heat the fuel. This is generally referred to as "ignition." The inertia of the compressed fuel can keep it from expanding long enough for significant energy to be produced before expansion of the fuel and the resultant cooling terminates the fusion reaction. Most conventional ICF target designs involve a spherical target which is imploded symmetrically from all directions, relying on the stagnation of the inwardly-accelerated fuel at the center of the sphere to produce the required densities and temperatures.

Production of the very high temperatures and densities required for fusion ignition may require a substantial amount of energy. The exact amount of energy required depends on the specific target design in use. In order to be useful for energy generation, the target must be capable of producing more energy from fusion reactions than was required to ignite it. In addition, the amount of energy required by the target must be physically and/or economically realizable by the drive mechanism being used.

For this reason, conventional ICF target designs have focused on achieving the required temperatures and densities as efficiently as possible. These designs are often complex in their construction and operation. They are also sensitive to imperfections in the target's manufacturing, as well as any non-uniformity in the delivery of energy to the target from the drive mechanism. Imperfection and non-uniformity can lead to asymmetry in the target's implosion, which may potentially reduce the densities and temperatures achieved below the threshold required for ignition. Furthermore, successful operation of these complex designs often requires achieving a precise balance between multiple competing physical processes, many of which are poorly understood and difficult to model. When actually constructed and deployed, these complex ICF target designs often fail to perform as their designers intended, and to date none have actually succeeded in producing ignition.

The National Ignition Facility ("NIF") target exemplifies the conventional approach. The NIF target involves an outer ablator shell comprising primarily plastic or beryllium with varius dopants surrounding a shell of cryogenic D-T ice with a central void filled with low-density D-T gas. The NIF target is placed in a cylindrical hohlraum. In operation, a laser consisting of 192 separate beamlines, with a total energy delivered to the hohlraum of up to 1.8 MJ, illuminates a number of spots on the inner surface of the hohlraum, producing a radiation field which fills the hohlraum. The radiation field ablates the ablator layer, and the reactive force of the ablation implodes the target. The laser pulse is 18 nanoseconds long and is temporally tailored in order to drive a series of precisely-adjusted shocks into the target. The timing and energy level of these shocks are adjusted in order to achieve a quasi-isentropic, efficient implosion and compression of the shell of D-T fuel. Stagnation of these shocks and inward-moving material at the center of the target is intended to result in the formation of a small "hotspot" of fuel, at a temperature of roughly 10 keV and a pr of approximately 0.3 grams/cm$^2$, surrounded by a much larger mass of relatively cold D-T fuel. It is intended that the fuel in the "hotspot" will ignite with a fusion burn propagating into the cold outer shell.

At the time of this disclosure, the NIF target has failed to ignite, achieving peak temperatures and densities of about 3 keV and a pr of approximately 0.1 grams/cm$^2$ in the hotspot, which is well short of the 10 keV and 0.3 grams/cm$^2$ that is believed to be required for ignition. There is no clear consensus on what has caused the failure of the NIF target to achieve ignition, but it appears that this failure may be partially due to low-order asymmetry in the hotspot formation and lower than expected implosion velocities.

BRIEF SUMMARY

ICF targets and techniques for their utilization are disclosed which may be simpler and more robust than conventional targets. In some embodiments, these targets may operate at large pr and/or may be imploded primarily by a single strong shock. In some embodiments, the entire volume of a region of fuel may be heated to a desired temperature at once, such that all the fuel mass may participate in the physical processes that leads to fusion ignition. Targets of this type are less sensitive to drive non-uniformity and to the temporal profile of driver energy delivery than conventional ICF targets. In some embodiments, the computational requirements for design and analysis of these targets' operation may be substantially reduced compared to conventional targets. Therefore, an ICF target design and implosion mechanism is presented that is more robust against non-uniformities, simpler to analyze, and simpler to utilize to achieve practical energy generation through ICF.

In some embodiments, an Inertial Confinement Fusion (ICF) target may include a case comprising a plurality of beam channels; an outer shell disposed within the case; a propellant disposed between the case and the outer shell; an inner shell disposed within the outer shell; an outer fuel disposed between the outer shell and the inner shell; and an inner fuel disposed inside the inner shell. The inner shell may be solid tungsten. The propellant may be beryllium foam. The outer fuel may be deuterium-tritium gas having a density of approximately 0.21 g/cm$^3$. At least one of the plurality of beam channels may completely penetrate the case into the propellant, but not penetrate the outer shell. At least one of the plurality of beam channels may include a hemispherical cavity in the propellant. A sphere of gold foam may be centered in a curvature of the hemispherical cavity in the propellant. At least one of the plurality of beam channels may include a conical absorption geometry. At least one of the plurality of beam channels may be perpendicular to the case.

In some embodiments, a method of imploding an Inertial Confinement Fusion (ICF) target may include directing laser energy into a plurality of beam channels in a case; absorbing the laser energy by a propellant disposed within the case; causing, by the propellant absorbing the laser energy, an outer shell disposed within the propellant to impulsively accelerate inward; propagating a shock through an outer fuel disposed within the outer shell; impulsively accelerating an inner shell disposed within the outer fuel inward; and compressing an inner fuel disposed within the inner shell. In some embodiments, the propellant may become ionized and optically thin. The laser energy may be converted into x-ray radiation that is distributed throughout the propellant. The x-ray radiation may be distributed throughout the propellant through thermal conduction and radiation transport in the optically thin propellant. The method may also include suppressing fluctuations in the inner fuel through interaction with a radiation field. The method may additionally include reflecting radiation emitted by the inner fuel using the inner shell. The inner shell may be solid tungsten. The propellant may be beryllium foam. The outer fuel may be deuterium-tritium gas having a density of approximately 0.21 g/cm$^3$.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
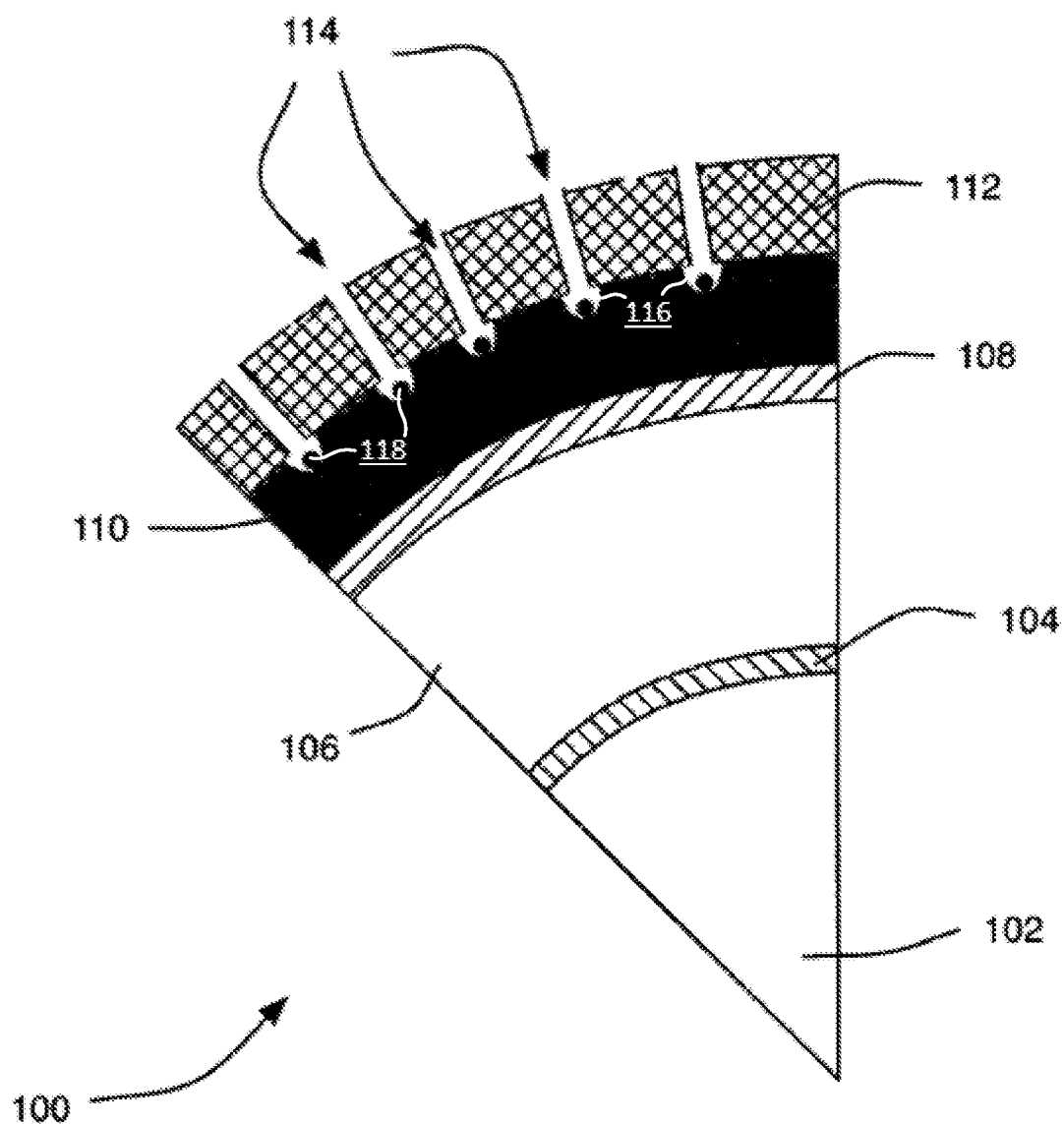
FIG. 1 illustrates a cross-section views of a target with two metal shells, two fuel regions, a propellant region, and a case region, according to some embodiments.

The term "Z" may refer to the atomic number of an element, i.e. the number of protons in the nucleus. The term "A" may refer to the atomic mass number of an element, i.e. the number of protons and neutrons in the nucleus.

The term "approximately" includes a given value plus/minus 15%. For example, the phrase "approximately 10 units" is intended to encompass a range of 8.5 units to 11.5 units.

The term "isentropic drive mechanism" may refer to a drive mechanism that is designed or utilized to compress material (such as fusion fuel) in an isentropic manner. "Isentropic" means compressing material while minimizing the total entropy increase (heating) of the material. Isentropic compression is therefore the most efficient way to compress material. When imploding a sphere or shell of material, such as an ICF target, isentropic compression requires that the drive mechanism deliver pressure to the material in a specific way over the entire duration of the compression, utilizing a low pressure initially that is increased over the course of the compression according to a mathematical formula. This can be difficult to achieve, and complicates the design of both the target drive mechanism and the driver that delivers energy to the drive mechanism (such as a laser or heavy ion beam).

The term "quasi-isentropic drive mechanism" may refer to a drive mechanism that approximates an ideal, perfectly-isentropic compression using a means other than a ramped pressure profile. For instance, drive mechanisms that compress material by producing a series of shocks of increasing strength may approach the efficiency of a perfectly-isentropic compression. While in some circumstances that are simpler than perfectly isentropic versions, these drive mechanisms are still complex to engineer.

The term "impulsive drive mechanism" may refer to a drive mechanism that compresses material impulsively, typically by the production of a single shock wave that accelerates the material and causes it to move inward. The pressure produced by an impulsive drive mechanism is typically highest at the beginning of the implosion, and decreases afterward. Impulsive drive mechanisms are limited in the amount of compression they can produce and in the efficiency of compression achieved. They may be simpler to design and use than other drive mechanisms. For instance, an impulsive drive mechanism may not require that the driver (laser, heavy ion beam, etc.) be active during the entire course of the implosion, but may instead deliver its energy over a shorter timescale, potentially short comparable to the timescale of hydrodynamic motion in the target.

The term "shock" may refer to sharp discontinuities in the flow of material. These discontinuities can be induced in any hydrodynamic variables such as temperature, pressure, density, velocity, etc.

The term "shock convergence" may refer to the convergence of a shock which may travel from an outer shell and to an inner shell. It is calculated as the ratio of the outer radius of an inner shell, $R_c$, and the inner radius of an outer shell $R_o$. That is, $$SC = \frac{R_O}{R_C}.$$

For instance, given a first shell with an inner radius of 10 cm, and a second shell disposed within the first shell with a inner radius of 0.5 cm, the shock convergence is 20. Any other combination of inner and outer radiuses can be used.

The term "atom" may refer to a particle of matter, composed of a nucleus of tightly-bound protons and neutrons with an electron shell. Each element has a specific number of protons.

The term "neutron" may refer to a subatomic particle with no electrical charge. Their lack of a charge means that free neutrons generally have a greater free range in matter than other particles. The term "proton" may refer to a subatomic particle with a positive electrical charge. The term "electron" may refer to a subatomic particle with a negative electrical charge, exactly opposite to that of a proton and having less mass than a proton and a neutron. Atoms under ordinary conditions have the same number of electrons as protons, so that their charges cancel.

The term "isotope" may refer to atoms of the same element that have the same number of protons, but a different number of neutrons. Isotopes of an element are generally identical chemically, but may have different probabilities of undergoing nuclear reactions. The term "ion" may refer to a charged particle, such as a proton or a free nucleus.

The term "plasma" may refer to the so-called fourth state of matter, beyond solid, liquid, and gas. Matter is typically in a plasma state when the material has been heated enough to separate electrons from their atomic nuclei.

The term "Bremsstrahlung radiation" may refer to radiation produced by interactions between electrons and ions in a plasma. One of the many processes that can cool a plasma is energy loss due to Bremsstrahlung radiation.

The product "ρr" may refer to the areal mass density of a material. This term may refer to a parameter that can be used to characterize fusion burn. This product is expressed in grams per centimeter squared, unless otherwise specified.

The term "runaway burn" may refer to a fusion reaction that heats itself and reaches a very high temperature. Because the D-T reaction rate increases with temperature, peaking at 67 keV, a D-T plasma heated to ignition temperature may rapidly self-heat and reach extremely high temperatures, approximately 100 keV, or higher.

The term "burn fraction" may refer to the percentage of fusion fuel consumed during a given reaction. The greater the burn fraction, the higher the energy output.

The term "convergence" may refer to how much a shell (or material) has been compressed radially during implosion. For instance, a shell that starts with a radius of 0.1 cm, R, and is compressed to a radius of 0.01 cm, $R_c$, during implosion has a convergence of 10. That is, $$C = \frac{R}{R_C}.$$

Nuclear fusion may refer to a type of reaction that occurs when certain atomic nuclei collide. In most of these reactions, two light nuclei combine, producing heavier nuclei and/or nuclear particles. In the process, some of the energy in the nuclear bonds holding the nuclei together is released, usually settling in the form of thermal energy (heat) in the material surrounding the reacting particles. These reactions only occur between atomic nuclei that are very energetic, such as those that have been heated to a high temperature to form a plasma. The specific temperatures vary between reactions. The reaction between deuterium and tritium, two hydrogen isotopes, is generally considered to require the lowest temperature for ignition. As other fusion reactions require higher temperatures, most nuclear fusion power concepts envision the use of D-T fuel.

Two challenges in using nuclear fusion to produce power are referred to as ignition and confinement. Achieving ignition requires heating a plasma of fusion fuel until it becomes hot enough to heat itself, meaning the energy released from fusion reactions exceeds the energy lost through various processes, such as Bremsstrahlung radiation and hydrodynamic expansion. The temperature at which this occurs is known as the "ignition temperature," which for D-T fuel can range from 2-10 keV, depending on the physical properties of the plasma. After ignition, self-heating in the fuel can cause it to reach temperatures of 100 keV or more.

Once fuel has been ignited, confinement may refer to the challenge of keeping the fuel from expanding (thus cooling and ceasing to burn) long enough for it to produce the desired amount of energy: at least as much energy as was required to ignite the fuel and keep it confined—and hopefully significantly more. While heating the fuel to ignition is simply a matter of delivering energy to it, confinement is more challenging. There is no known way to confine a plasma heated to ignition temperature or beyond with a simple mechanical system. Any solid substance, such as the metal wall of a container, that comes into contact with a fusion plasma would either become instantly vaporized, would drastically cool the plasma and stop the burn itself, or both.

One method of confinement uses a magnetic field to keep the fuel from expanding. This is referred to as Magnetic Confinement Fusion (MCF). Magnetic confinement has many inherent difficulties and disadvantages, and economical power generation from an MCF facility appears decades away.

Another approach takes advantage of how the characteristics of fusion burn change with fuel amount and density. At ordinary densities and practicable amounts, a D-T plasma heated to ignition temperature will disassemble (expand and stop burning) before producing anywhere near the energy required to originally heat it. However, as the density of a given amount of fuel is increased, the rate at which the fuel will burn increases faster than the rate at which it will expand. This means that, if the fuel can be compressed sufficiently before heating it, the fuel's own resistance to motion (inertia) will keep it from expanding long enough to yield a significant amount of energy. This approach is referred to as Inertial Confinement Fusion (ICF).

At the pressures and temperatures involved in imploding and burning ICF targets, specific material properties that one observes in everyday life (hardness, strength, roomtemperature thermal conductivity, etc.) may be irrelevant, and the hydrodynamic behavior of a material can depend most strongly on the material's average atomic number, atomic mass number, and solid density. As such, in discussing material requirements in ICF targets, it is convenient to discuss classes of material. For the purposes of the following discussion, the term "low-Z" will refer to materials with an atomic number of 1-5 (hydrogen to boron); the term "medium-Z" will refer to materials with an atomic number of 6-47 (carbon to silver); and the term "high-Z" will refer to materials with an atomic number greater than 48 (cadmium and above). Unless otherwise stated, the use of these terms to describe a class of material for a specific function is intended only to suggest that this class of material may be particularly advantageous for that function, and not (for instance) that a "high-Z" material could not be substituted where a "medium-Z" material is suggested, or vice-versa.

Specific material choice may be important, where indicated, as different isotopes of the same element may undergo completely different nuclear reactions, and different elements may have different radiation opacities for specific frequencies. The differing solid densities of materials with similar-Z may also important for certain design criteria in some embodiments.

FIG. 1 illustrates a cross-section views of a target with two metal shells, two fuel regions, a propellant region, and a case region, according to some embodiments. A target assembly 100 comprises a central spherical fuel region, or inner fuel region 102. Inner fuel region 102 may have a radius of approximately 0.0764 cm and may be filled with deuterium-tritium gas at a density of approximately 0.1 g/cm³. Surrounding inner fuel region 102 may be an inner shell 104, which may include a spherical shell of solid tungsten with an outer radius of approximately 0.0821 cm. Surrounding inner shell 104 may be an outer shell 108, which may include a spherical shell of solid tungsten with an inner radius of approximately 0.2293 cm and an outer radius of approximately 0.2355 cm. In the space between inner shell 104 and outer shell 108 may be an outer fuel region 106 filled with deuterium-tritium gas at a density of approximately 0.21 g/cm³.

Surrounding outer shell 108 may be a propellant region 110. Propellant region 110 may have an outer radius of approximately 0.3083 cm and comprises beryllium foam at a density of approximately 1.0 grams per cm³. Surrounding propellant region 110 may be a case 112 that includes a spherical shell of solid tungsten with an outer radius of approximately 0.3212 cm.

A multitude of cylindrical beam channels 114, each having a diameter of approximately 100 microns, may penetrate the entire thickness of case 112. The long axis of each beam channel 114 may be normal to the surface of case 112. In some embodiments, there may be 202 beam channels in total. Each beam channel 114 may completely penetrate case 112. At the end of each beam channel 114 (where they exit case 112) may be a hemispherical cavity 116 in propellant 110. These cavities 116 may be approximately 100 microns in radius. Centered in the curvature of each cavity 116, and coaxial with each beam channel 114, may be a gold foam radiator 118. Each gold foam radiator 118 may comprise a sphere of gold foam approximately 50 microns in radius, having a density of approximately 10 g/cm³.

Relative to a conventional ICF target assembly, case 112 may be considered analogous to the hohlraum, propellant 110 may be considered analogous to the vacuum or gas-filled space within the hohlraum, and metal shell 108 and any components inside it may be considered the "fuel capsule," "fuel pellet," or simply "target." However, in the following discussion, the term "target" may be used to refer to the entire target assembly 100.

Target assembly 100 may be ignited in the following manner. Target assembly 100 may be placed in an ICF reaction chamber that is configured to contain the energy that will be released by the target assembly 100. An ICF laser is configured in such a way as to produce a pattern of, for example, 202 spots of laser light, each 100 microns in diameter, each aligned with a corresponding one of the beam channels 114. These spots may be produced as a 0.5 nanosecond pulse of approximately constant power having a total energy of 9.9 MJ, with the pulse energy evenly distributed between all of the spots.

The laser light may first be absorbed in the gold radiators 118 through a combination of collisional and resonance absorption, and this may occur before significant hydrodynamic motion occurs in the target. The gold radiators 118 may re-radiate the laser energy as x-ray radiation into the propellant 110. The propellant 110 may become ionized and optically thin to the x-rays, and the propellant region may begin to act as a closed hohlraum with the outer shell 108 and case 112 acting as hohlraum walls. Radiation transport and thermal conduction in the propellant region may distribute the laser energy throughout the propellant 110.

Ultimately, approximately 1.9 MJ of energy may be lost due to radiation and heated material escaping back out the beam channels 114. The total energy ultimately coupled to the target assembly in this embodiment may be approximately 8 MJ. The total energy coupled to metal shell 108 and the components inside (the "fuel capsule") may be approximately 2.25 MJ.

As propellant 110 is energized, radiation may penetrate outer shell 108 and heat an outer layer of the shell material. The outward expansion of this outer layer of outer shell 108 may be tamped by the material pressure in propellant 110 and the mass of metal case 112. The inner part of outer shell 108 may thus impulsively be accelerated inwards, driving a strong shock into outer fuel region 106.

When the shock driven through outer fuel region 106 reaches inner shell 104, the shell may be accelerated inwardly and may reach a peak inward velocity of approximately 2.0×107 cm/sec. The inward motion of inner shell 104 and the convergence of the shock it launches may result in compression and heating of the fuel in inner fuel region 102. The peak areal density reached in inner fuel region 102 may be 1.1 g/cm². Because of this relatively high areal density, the dominant energy loss mechanism of the fuel may be radiation emission. The high radiation opacity of inner shell 104 may lower the radiative energy loss of the fuel in inner fuel region 102 by reflecting a substantial fraction of radiated energy back into inner fuel region 102. Because of this, ignition of the fuel in inner fuel region 102 may occur at a relatively low temperature of 2.5-3 keV. Once ignited, the temperature of the fuel in inner fuel region 102 may rise further due to self-heating effects, and fusion reactions in inner fuel region 102 may produce a substantial amount of energy, e.g. approximately 36 MJ.

The high temperatures and pressures produced by the fusion yield in inner fuel region 102 may drive inner shell 104 outward. Outer fuel region 106 may be compressed and heated by the outward motion of inner shell 104 and the remaining inward motion of outer shell 108. Outer fuel region 106 may be further heated by the scattering of neutrons produced by fusion reactions in inner fuel region 102 and/or by radiation emitted by fuel in inner fuel region 102. This heating and compression may lead to substantial additional fusion reactions in outer fuel region 106, which may produce an additional 5 MJ of yield in some embodiments.

In some embodiments, outer fuel region 106 may ignite and undergo runaway burn, and the majority of fusion yield from the target may be produced in outer fuel region 106. In some embodiments, heating by neutron scattering may be sufficient to heat outer fuel 106 to ignition temperature, before the PdV heating from inner shell 104 becomes significant. Increasing the pr of outer fuel region 106, e.g. by scaling the entire target proportionally to a greater size, may increase the relative fraction of yield produced by outer fuel region 106 and/or lower the threshold required for ignition of outer fuel region 106.

The implosion process of this embodiment has numerous advantages relative to that utilized by conventional ICF targets, such as a NIF-style target. The "propellant drive" mechanism utilizing a short laser pulse energizing a closed hohlraum is straightforward to model and analyze because the spherically symmetric geometry is less complicated than the sphere-in-cylinder geometry used in conventional ICF targets, and the short pulse length means that the laser absorption and target drive are accomplished before significant hydrodynamic motion has occurred. As a result, laser coupling and absorption in the target is separated in time from implosion of the target. Furthermore, due to the high reflectivity of outer shell 108 and case 112, there may be significant radiation smoothing of the temperature non-uniformity in propellant 110, which in some embodiments may substantially improve the uniformity of the target drive and smooth any non-uniformity in the laser energy delivered.

The implosion of the target assembly 110 is simple and robust and insensitive to many effects that conventional targets may be highly sensitive to. In some embodiments, outer shell 108 may be imploded by a single shock generated by a 0.5 nanosecond laser pulse, and the generation of this shock is not sensitive to details of the pulse shape, such that almost any pulse shape that delivers 9.9 MJ in a few nanoseconds or less can be used. Outer fuel region 106, inner shell 104, and inner fuel region 102 may consequently be imploded primarily by this same single shock. As such, there is no need to design or optimize the power or timing of a series of multiple shocks, as are used in the NIF target, and precise knowledge of the radiation opacities of materials in the drive region is not required. Additionally, the target is insensitive to the effects of hot electrons generated by laser absorption in the propellant 110.

Furthermore, the implosion process exemplified by this embodiment may be more robust against hydrodynamic instability growth and drive non-uniformity than that of a conventional ICF targets. Outer shell 108 and inner shell 104 in some embodiments may be subjected to a more impulsive acceleration than the shell in the NIF target, with inner shell 104 in particular being accelerated primarily by a converging shock and outer shell 108 being accelerated by the deposition of energy into propellant 110 over a short timescale. This impulsive acceleration results in more Richtmeyer-Meshkov (RM) instability growth than Rayleigh-Taylor (RT) instability growth. RM growth may in general be less severe than RT growth. Also, the implosion symmetry properties of a converging shock may be superior to those of an accelerated shell of material over the same convergence. Finally, the material convergence of inner shell 104 may be approximately 12, which may be substantially lower than the material convergence of a NIF-style target, and this may also result in substantially less instability growth.

Furthermore, this embodiment need not involve a shell "collision." Outer shell 108 need never contact inner shell 104; the acceleration of inner shell 104 may be accomplished by the shock that outer shell 108 launches through outer fuel region 106. This may improve the stability properties of the implosion further, as the transfer of hydrodynamic perturbations from outer shell 108 to inner shell 104 may be significantly reduced.

The ignition process of inner fuel region 102 in this embodiment also has numerous advantages relative to that utilized by conventional ICF targets. Because of the large fuel mass and the high-Z material of inner shell 104 surrounding inner fuel region 102, the ignition temperature of the D-T fuel in inner fuel region 102 may be approximately 2.5-3 keV, as opposed to the approximately 10 keV required for ignition of a NIF-style target. Furthermore, because of the relatively low ignition temperature and high areal density pr, interaction with the radiation field in the DT gas may strongly damp acoustic perturbations of wavelengths comparable to the fuel dimensions, and the ignition process may be more isothermal as compared to NIF or conventional targets. Finally, ignition may occur before stagnation of the inner surface of inner shell 104 in some embodiments, which may lower the growth factors for hydrodynamic instability at the time of ignition compared to conventional targets. For these reasons, the ignition process may be much more stable against perturbations. This, along with the simplicity and robustness of the single-shock implosion process with low material convergence, can provide for high confidence in successful target operation.

These characteristics of the target implosion and ignition process may also greatly simplify the process of designing and analyzing the behavior of a given target using analytical techniques or numerical simulations. In some embodiments, some of these advantages may become significant when the embodiment is configured to reach a peak areal density (pr) in inner fuel region 102 of approximately 0.6 grams per cm$^2$ or greater.

Numerous variations and alternate embodiments are possible. The density of the fuel in inner fuel region 102 may be increased or decreased, and the radius of inner fuel region 102 may be increased or decreased. Fuels other than an equimolar mixture of D-T may be used, including pure deuterium fuel, or fuels with a reduced tritium concentration. A decrease in the density of the fuel in inner fuel region 102 may increase the temperatures achieved during implosion of inner fuel region 102, but may also decrease the peak pr achieved and increase the temperature required for ignition. An increase in radius of inner fuel region 102 while maintaining a fixed density may improve pr, while decreasing peak temperature achieved during implosion or requiring more drive energy to achieve the same temperature.

The parameters characterizing outer fuel region 106 may be adjusted as well. Fuels other than an equimolar mixture of D-T may be used. Inert materials may be used as well, transforming fuel region 106 into a shock propagation region that does not contribute yield.

Generally, increasing the thickness of outer fuel region 106 may increase the strength of the shock that accelerates inner shell 104, and improve ignition characteristics of inner fuel region 102. This may increase the amount of energy required to drive the target and/or increase the sensitivity of the target to drive non-uniformity.

Other materials may be substituted for the DT fuel in outer fuel region 106. Some of these materials may be inert, but we will nonetheless still refer to this region as the "outer fuel region" 106. Increasing the density of the material used in outer fuel region 106 may decrease the fluid velocity behind the shock and affect the acceleration profile of inner shell 104. Use of low-Z material in outer fuel region 106 may be advantageous, to minimize the energy spent on ionization.

The thickness of inner shell 104 may be increased or decreased. Use of high-Z materials, or materials with a high opacity to radiation in the 0.5-3 keV range, may be advantageous in inner shell 104, but other materials may be substituted as well. The thickness of inner shell 104 may affect the implosion of inner fuel region 102. Reducing the thickness of inner shell 104 may lead to higher implosion velocities in some embodiments, but a thinner inner shell 104 may be more susceptible to disruption from hydrodynamic instabilities.

The thickness of outer shell 108 may be increased or decreased. An outer shell 108 with a significantly reduced thickness may be completely penetrated by radiation from propellant 110 without launching a strong shock, while significantly increasing the thickness of outer shell 108 may reduce the strength of the shock launched and the efficiency of the drive. Use of a high-density material or high mass outer shell 108 may provide better tamping of fusion burn in outer fuel region 106.

The propellant 110 may be increased or decreased in density, and/or changed in composition. Increasing the density of propellant 110 may provide better tamping and help launch a stronger shock, but may negatively affect the drive uniformity by reducing the degree of radiation smoothing in propellant 110. If the density of propellant 110 is increased such that the ionized propellant material is not optically thin, then thermal conduction may be the dominant smoothing and energy transport mechanism. Use of materials with a lower Z may be advantageous to minimize the energy spent on ionization and maintain high temperatures in propellant 110.

Numerous variations of beam channels 114 are possible. The number of beam channels can be increased or decreased. A greater number of beam channels may increase the uniformity of the acceleration of outer shell 108, but may also decrease the efficiency of the drive mechanism by permitting more loss through beam channels 114. The diameter of beam channels 114 may be increased or decreased as well, and this requirement may be primarily dictated by the optical quality of the laser.

The uniformity of acceleration of outer shell 108 may be determined in part by the uniformity of the radiation field that fills propellant 110 in operation after the laser energy is absorbed. In some embodiments, the temperature of the radiation field may reach a value of 300 eV. In some embodiments, the uniformity may be improved by increasing the temperature of the radiation field, with higher temperatures leading to greater uniformity. The temperature may be increased by increasing the energy of the laser pulse used to energize the propellant, or by changing the material used in propellant 110. In some embodiments, the uniformity may also be improved by increasing the thickness of propellant 110.

The laser pulse length and total energy may be varied as well. As the target is scaled up or down proportionally, the laser energy may be scaled with the cube of the relative change in radius, and this may preserve the overall hydrodynamic behavior of the target. If the laser energy is increased while the other target dimensions remain constant, the strength of the shock launched into outer fuel region 106 may be increased, the maximum velocity of inner shell 104 may be increased, and the peak compression and/or heating of inner fuel region 102 may be increased. As discussed above, the temperature achieved in propellant 110 may also be increased, and this may also result in improvements to drive non-uniformity. However, as temperatures and energies in the propellant are increased, radiation in propellant 110 may bleach through outer shell 108 and compromise the launching of the shock into outer fuel region 106. Embodiments of this invention may be relatively insensitive to laser pulse length, though the maximum practical pulse length may be set by the timescale of ablated material filling beam channels 114, and/or the timescale over which the process of accelerating outer shell 108 occurs.

The minimum size of the target assembly 100 may be determined in part by the pr achieved in inner fuel region 102. As any given embodiment is reduced in size while maintaining hydrodynamic equivalence, the pr achieved in inner fuel region 102 during implosion may decrease. As pr decreases, the mechanism of operation of the embodiment will gradually change, and below a certain threshold, some or all of the advantages described above may be lost and ignition may not occur. For example, as pr decreases, the temperature required to achieve ignition in inner fuel region 102 may increase. Radiation damping of perturbations in inner fuel 102 may decrease and electron thermal conduction, as opposed to radiation transport, may become the dominant mechanism of energy loss from inner fuel 102. Thus, the target may move away from the equilibrium ignition regime, and ignition of inner fuel 102 may become more dependent on the details of hydrodynamic motion and temperature profiles achieved in inner fuel 102, and thus may become more sensitive to perturbations introduced into inner fuel 102 by nonuniformity in the target's manufacturing or drive mechanism. At some point as the size of the embodiment is reduced, the implosion velocity and/or uniformity of implosion may be insufficient to achieve ignition of inner fuel 102, given the reduced pr. The exact point at which this transition occurs may vary between embodiments but in general, the minimum pr may be characterized as an areal density of approximately 0.6 g/cm$^2$ in the entire inner fuel region 102, evaluated at the time of stagnation of the inner surface of inner shell 104. The minimum size may be bounded by the size necessary to achieve this pr while still being imploded by an impulsive drive mechanism and a single strong shock.

The diameter of the beam channels may be increased or decreased. In some embodiments, the closing of the beam channels due to material ablated off the channel walls may be a factor limiting the laser pulse length and/or energy. Increasing the diameter of the beam channels may allow the use of a longer laser pulse length and/or larger laser energy, but in some embodiments may decrease the efficiency of the drive by allowing more radiation to escape out the channels.

The geometric arrangement of the beam channels may be modified as well. Several possible arrangements are illustrated schematically in FIGS. 2A-2D. Note that in FIGS. 2A-2D, components inside outer shell 108 are not illustrated for the sake of clarity: only outer shell 108, propellant 110, and case 112 are shown, along with lines indicating the arrangement of laser beams 200 and corresponding beam channels 114. Additionally, each beam 200 and beam channel 114 is labeled explicitly in FIG. 2A, while only one of each is labeled in FIGS. 2B-2D for clarity.

Figure 2A:
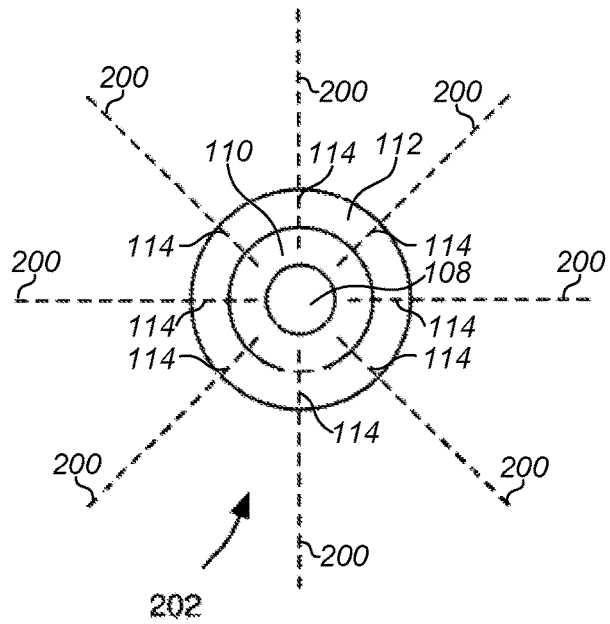
FIGS. 2A-D illustrate several possible laser beam channel configurations that may be utilized with ICF targets, according to some embodiments.

Configuration 202 in FIG. 2A illustrates a radial beam geometry, as would be used in direct-drive ablation, where beams 200 and beam channels 114 are aligned perpendicular to the surface of case 110, and distributed evenly in all directions. The depth of the channels may be constant, so that each channel terminates at the same radius, or varied, so that some channels are deeper than others. This geometry is conceptually simple, but may require absorbing laser light over a shorter distance than other beam geometries, which may limit the amount of energy that can be delivered. This geometry may also require more beams to achieve the desired pressure uniformity, as each beam may heat a relatively localized region in propellant 110.

Figure 2B:
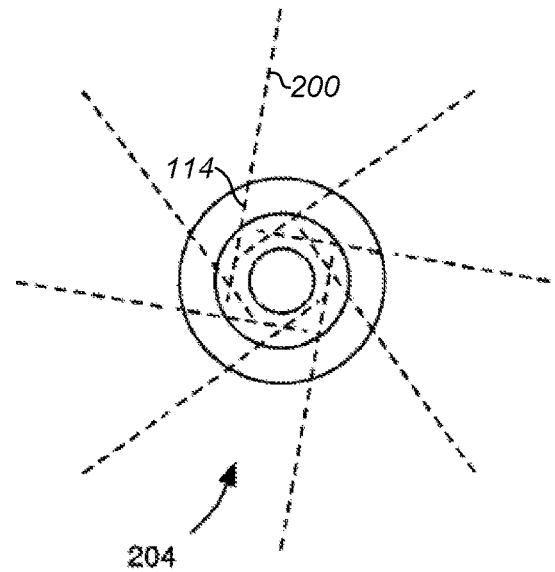

Configuration 204 in FIG. 2B illustrates an oblique beam geometry, in which each beam 200 and channel 114 is aligned at an angle to the surface of case 110 so as to travel a longer distance in the propellant 110. In some embodiments, channels 114 may terminate on the outer surface of outer shell 108, or the opposite inside surface of case 110. This geometry is slightly more complex to design to produce symmetric coverage throughout the entire propellant, but may have more favorable absorption and symmetry characteristics, due to the larger propellant surface area exposed to each beam.

Figure 2C:
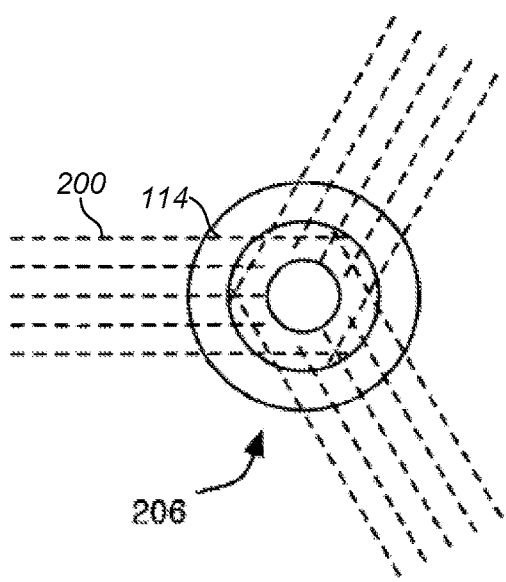

Configuration 206 in FIG. 2C illustrates a collinear multibeam geometry, in which a small number of "macrobeams," each consisting of a large number of collinear "beamlets," illuminate the target evenly from all directions. Each beamlet may be aimed into a single channel 114, and the channels may have varying depths so as to provide symmetric coverage throughout the entire propellant 110. This geometry may be the most complex to design symmetrically, but the grouping of a multitude of individual beams into a smaller number of "macrobeams" potentially allows for a more economical reactor chamber and laser by reducing the number of beam entrance ports required.

Figure 2D:
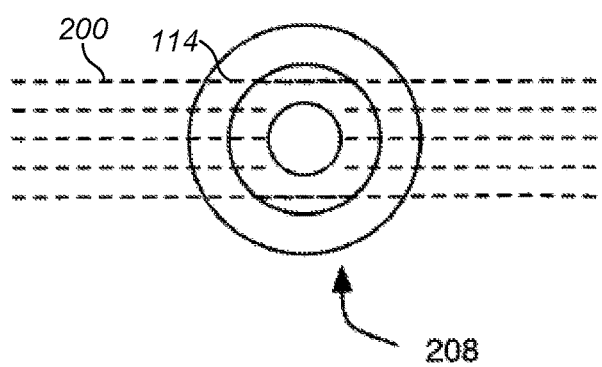

Configuration 208 in FIG. 2D illustrates a polar geometry, in which two sets of collinear beamlets oriented 180 degrees apart illuminate opposite poles of the target.

In all configurations, uniformity of energy deposition and distribution in the propellant may be enhanced by varying the length of each beam channel 114 through the propellant 110, the allocation of laser energy to each beam channel 114, and other parameters of channel 114.

In some embodiments, the profile of the wall of the beam channels may also be modified. FIGS. 3A-3E show several possible beam channel shapes. In some embodiments, the shape of the channels through the case 112 may be relatively unimportant, but the shape of the channels inside the propellant 110 can affect the absorption process.

Figure 3A:
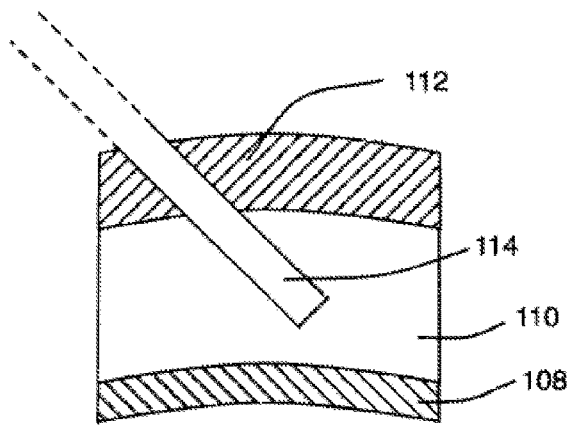
FIGS. 3A-3E illustrate several possible beam channel and absorption region configurations that may be utilized with ICF targets, according to some embodiments.
Figure 3B:
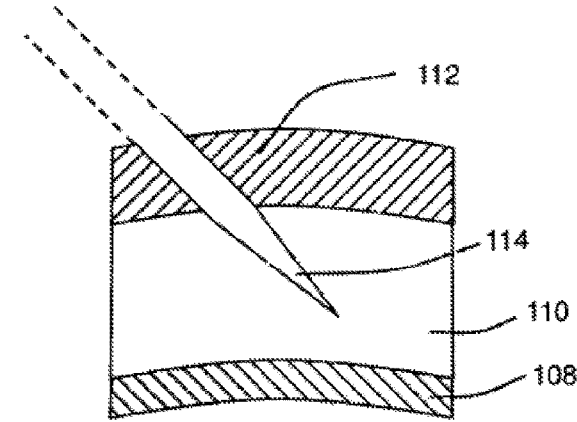
Figure 3C:
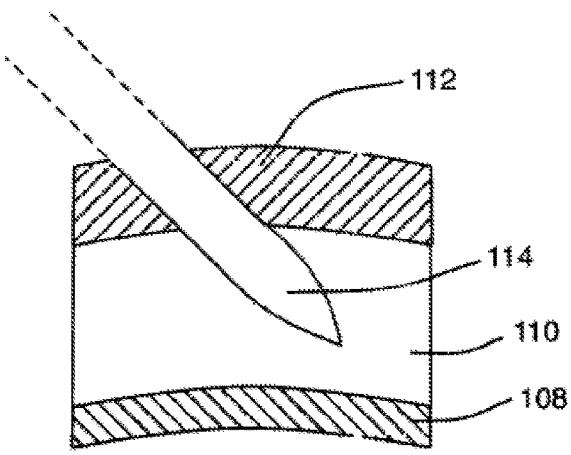
Figure 3D:
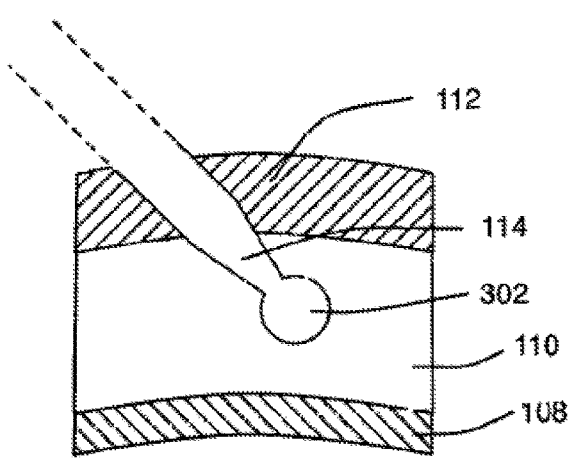
Figure 3E:
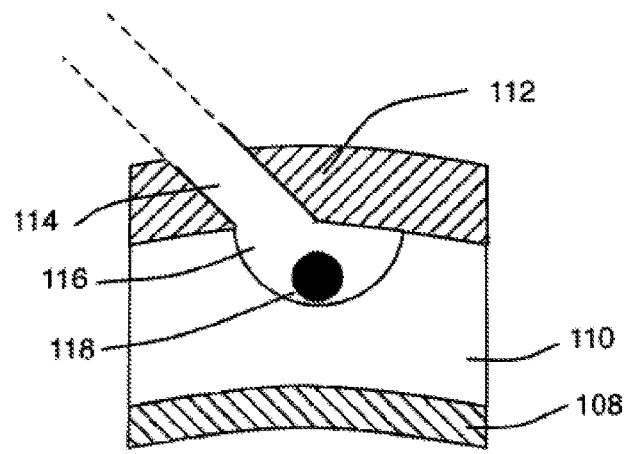

FIG. 3A illustrates a cylindrical and rectangular absorption geometry, which may be the simplest to manufacture, but in some embodiments may not result in uniform absorption over the entire channel 114. FIG. 3B illustrates a conical or pyramidal absorption geometry, in which the width of channel varies approximately linearly with depth in the channel, and the laser light may be absorbed over the entire length of the channel 114. As shown in FIG. 3B, channels 114 may extend through both case 112 and propellant 110. In some embodiments, the intensity profile of the laser beams may not be constant across the entire diameter of the channel, as many common lasers may produce a gaussian intensity profile. FIG. 3C illustrates a tapered absorption geometry, in which the curve of the channel 114 surface may be designed to match the changing intensity of the laser spot, so as to ensure a constant flux over the entire surface of the channel wall. FIG. 3D illustrates a channel with a terminal chamber 302 located at the end of channel 114. Chamber 302 may be empty or may be filled with material, e.g. foam, and/or absorption spheres 118 as described above. The shape of and/or presence of material in terminal chamber 302 may improve absorption characteristics of laser light entering the beam channel 114. The material used in chamber 302 may be different from that used in propellant 110. FIG. 3E illustrates a configuration involving a hemispherical absorption chamber 116 and radiator sphere 118, with radiator sphere 118 centered in absorption chamber 116 and directly in line with the axis of beam channel 114.

In some embodiments, the designer may choose a combination of geometry, dimensions, materials, densities, and laser parameters that does not lead to the conditions required for ignition being reached in inner fuel region 102 in operation. Such targets may be advantageous for experimental purposes, for validation of computational design codes, for testing of diagnostic and monitoring equipment, and/or for use in ICF target chambers that may have limited ability to contain the output of fusion reactions.

Figure 4:
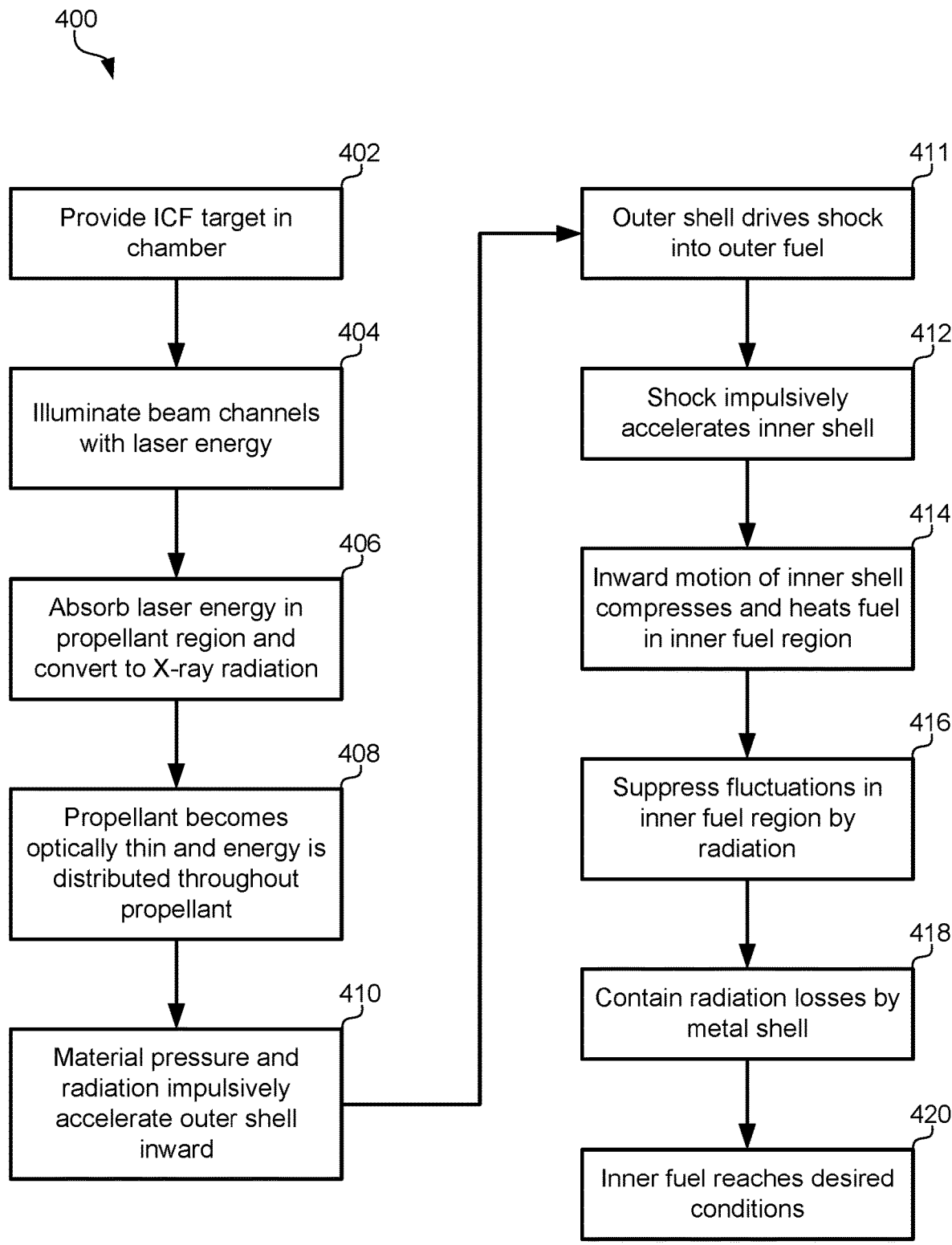
FIG. 4 illustrates a flowchart of a method for imploding ICF targets, according to some embodiments.

FIG. 4 illustrates a flowchart 400 of a method for imploding the target configurations described above. In step 402, a target as described above comprising at least a inner fuel region, an inner shell, an outer fuel region, an outer shell, a propellant, a case, and beam channels may be positioned in a suitable ICF reaction chamber. In step 404, the target may be illuminated with a laser pulse, which may direct laser energy into the beam channels. In step 406, the laser energy may be absorbed by the propellant material on the walls of the beam channels, and/or by material(s) present in the channels themselves, and converted to x-ray radiation. In step 408, the propellant may become ionized and optically thin, and the laser energy may be distributed throughout the propellant region. This may be achieved through thermal conduction and radiation transport in the optically thin propellant. In step 410, the pressure of the material and/or radiation ablation may result in the impulsive inward acceleration of the outer shell. In step 411, this impulsive acceleration may result in the formation of a shock being driven through the outer fuel. In step 412, this shock collides with and impulsively accelerates the inner shell. In step 414, the inward motion of this inner shell may compress and heat the fuel in the inner fuel region. In step 416, perturbations in the pressures and densities in the inner fuel region may be damped by interaction with the radiation field. In step 418, the inner shell may reflect and trap radiation emitted by the inner fuel and reduce the radiation losses from the inner fuel. In step 420, the inner fuel may reach the desired conditions at the end of the implosion, which may include conditions that are anticipated to result in fuel ignition, and/or conditions that are intended for experimental investigation and observation of target behavior.

As discussed above, this implosion and ignition process may be more robust and less sensitive to drive non-uniformity and implosion asymmetry than other methods of imploding an ICF target. Steps in the process described above are presented in a specific order for clarity but in practice certain steps may overlap in time or may occur simultaneously.

The set of embodiments discussed in this application is intended to be exemplary only, and not an exhaustive list of all possible variants of the invention. Certain features discussed as part of separate embodiments may be combined into a single embodiment. Additionally, embodiments may make use of various features known in the art but not specified explicitly in this application.

Embodiments can be scaled-up and scaled-down in size, and relative proportions of components within embodiments can be changed as well. The range of values of any parameter (e.g. size, thickness, density, mass, etc.) of any component of an embodiment of this invention or of entire embodiments in this application should not be construed as a limit on the maximum or minimum value of that parameter for other embodiments, unless specifically described as such.

What is claimed is:

1. An Inertial Confinement Fusion (ICF) target comprising:
   a case comprising a plurality of beam channels, wherein at least one of the plurality of beam channels is at an angle to a surface of the case;
   an outer shell disposed within the case;
   a propellant disposed between the case and the outer shell,
      wherein at least one of the plurality of beam channels penetrates the case into the propellant,
      wherein at least one of the plurality of beam channels comprises a hemispherical cavity in the propellant, and
      wherein the at least one of the plurality of beam channels comprises a sphere of gold foam centered in a curvature of the hemispherical cavity in the propellant;
   an inner shell disposed within the outer shell, wherein the inner shell is comprised of a high-Z material;
   an outer fuel disposed between the outer shell and the inner shell, wherein the outer fuel is comprised of a mixture of deuterium and/or tritium gas having a density of approximately 0.21 g/cm$^3$; and
   an inner fuel disposed inside the inner shell.

2. The target of claim 1, wherein the inner shell is comprised of solid tungsten.

3. The target of claim 1, wherein the propellant is comprised of beryllium foam.

4. The target of claim 1, wherein the outer fuel is comprised of deuterium-tritium gas.

5. The target of claim 1, wherein at least one of the plurality of beam channels completely penetrates the case into the propellant, but does not penetrate the outer shell.

6. The target of claim 1, wherein at least one of the plurality of beam channels comprises a conical absorption geometry.

7. The target of claim 1, wherein at least one of the plurality of beam channels is perpendicular to the case.

8. A method of imploding an Inertial Confinement Fusion (ICF) target, the method comprising:
   directing laser energy into a plurality of beam channels in a case, wherein at least one of the plurality of beam channels comprises a hemispherical cavity in a propellant, and wherein the at least one of the plurality of beam channels comprises a sphere of gold foam centered in a curvature of the hemispherical cavity in the propellant;
   absorbing the laser energy by a propellant disposed within the case;
   causing, by the propellant absorbing the laser energy, an outer shell disposed within the propellant to impulsively accelerate inward;
   propagating a shock through an outer fuel disposed within the outer shell, wherein the outer fuel has a density of approximately 0.21 g/cm³;
   impulsively accelerating an inner shell disposed within the outer fuel inward; and
   compressing an inner fuel disposed within the inner shell.

9. The method of claim 8, wherein the propellant becomes ionized and optically thin.

10. The method of claim 9, wherein the laser energy is converted into x-ray radiation that is distributed throughout the propellant.

11. The method of claim 10, wherein the x-ray radiation is distributed throughout the propellant through thermal conduction and radiation transport in the optically thin propellant.

12. The method of claim 8, further comprising suppressing fluctuations in the inner fuel through interaction with a radiation field.

13. The method of claim 8, further comprising reflecting radiation emitted by the inner fuel using the inner shell.

14. The method of claim 8, wherein the inner shell is comprised of solid tungsten.

15. The method of claim 8, wherein the propellant is comprised of beryllium foam.

16. The method of claim 8, wherein the outer fuel is comprised of deuterium-tritium gas.

\* \* \* \* \*